Jan. 27, 1953 — W. M. SCHOLL — 2,626,886
LAMINATED SHEET AND METHOD OF MAKING SAME
Filed Nov. 22, 1949
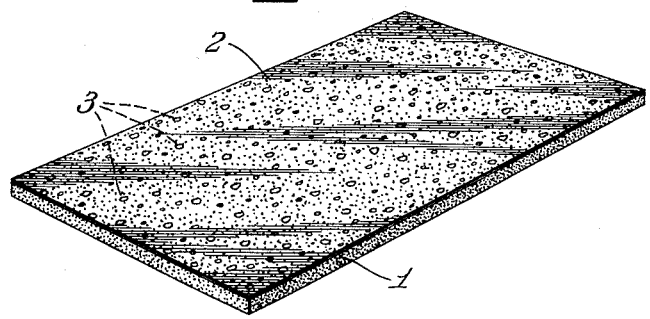
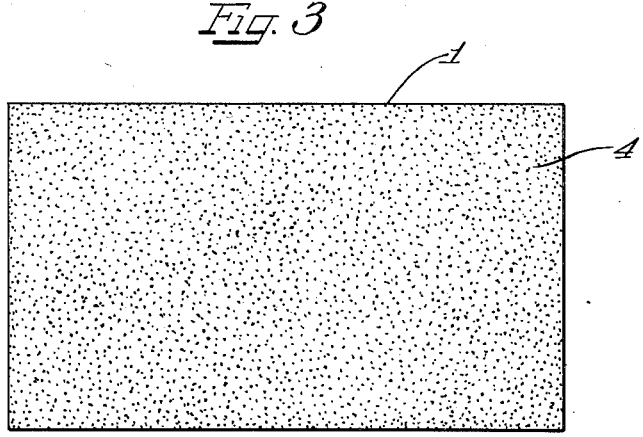
Inventor
William M. Scholl Patented Jan. 27, 1953

2,626,886

UNITED STATES PATENT OFFICE 2,626,886

LAMINATED SHEET AND METHOD OF MAKING SAME

William M. Scholl, Chicago, Ill.

Application November 22, 1949, Serial No. 128,749

3 Claims. (Cl. 154—103)

This invention relates to improvements in a laminated sheet, and more particularly to a laminated material embodying a layer of resilient or cushioning material, and a thinner covering layer of smooth air impervious material, the resultant structure having many and various uses and purposes, as will be apparent to one skilled in the art.

More specifically the instant invention relates to a laminated material highly desirable for use as a stock sheet from which corn pads, bunion and callous pads, insoles, various types of bandages, either with or without apertures, and similar devices for application to the human body may be cut. The relatively thin covering layer provides a smooth surface over which articles of apparel will slide freely without drag. The laminated material may also be used outside the medical or surgical field as a covering medium for various items wherein a soft resilient cover is desired and which has an easily cleansed and relatively smooth outside surface.

With these thoughts in mind, it is an object of the instant invention to provide a laminated sheet or material embodying a relatively thick layer of resilient substance over which a relatively thin layer of a suitable plastic material is provided, the two layers being adhered together in any suitable manner.

It is also a object of this invention to provide a laminated material embodying a relatively thick layer of resilient material such as cellular rubber or the like, and a layer in the form of a plastic film adhered to the first mentioned layer.

A further feature of the invention resides in the provision of a laminated material comprising a layer from cellular rubber-like substance having relatively fine pores on one side and coarser pores on the other side, with a suitable plastic film overlying the side having the coarser pores.

It is also a feature of this invention to provide a laminated material comprising a relatively thick layer of foam latex to which is adhered a vinyl plastic film.

Still a further object of the invention is the provision of a new and novel method of making a laminated material, including the steps of splitting a sheet of foam latex, and then adhering a plastic film to one of the latex sheets resulting from the splitting operation, and over the side of the latex sheet having the coarser pores or larger open cell surfaces.

While some of the more salient features, characteristics and advantages of the instant invention have been above pointed out, others will become apparent from the following disclosures, taken in conjunction with the accompanying drawing, in which—

Figure 1 is a pictorial showing of a laminated material embodying principles of the instant invention;

Figure 2 is an enlarged fragmentary transverse vertical sectional view through the structure of Fig. 1; and Figure 3 is a bottom plan view of the structure of Figs. 1 and 2.

As shown on the drawings:

In the illustrated embodiment of this invention there is shown a laminated sheet or laminated material embodying a relatively thick layer 1 of resilient material. A highly satisfactory material for the formation of this sheet is foam latex which has the advantages of extreme lightness in weight, high resiliency, and high restorative power so that even under continued pressure the layer will instantly assume its original shape and size when pressure is removed, no permanent compacting of the substance resulting.

Adhered to this layer 1, is a second and preferably much thinner layer 2 of smooth substantially impervious material. A vinyl plastic is highly suitable for this purpose. It will be noted from a comparison of the showings in Figs. 1 and 3 that should the layer 1 have larger open cells or coarser pores such as indicated at 3 in Fig. 1 on one side thereof than it has upon the other side or face 4 thereof, the thin layer 2 preferably covers the side having the coarser pores so as to seal those pores.

A preferred method of making the instant invention is to take a sheet of foam latex, which in its manufactured state will have fine open cells or pores on both faces thereof, of the character of the face 4. This sheet is then split, providing a pair of thinner sheets each having a fine pore face and a coarse pore face. A vinyl plastic film may then be applied over the coarse pore face of one of these split sections of the foam latex to provide the structure illustrated in the drawings. The other split section of foam latex may similarly be treated to provide another laminated sheet of the same character. Thus, the vinyl film will close and seal the coarse pores.

The vinyl film may be applied in any desirable or suitable manner, such as by adhering it to the foam latex layer with the aid of adhesive, or by spraying the film on the foam latex layer. Either way has proven satisfactory. Of course, the completed laminated sheet may be made in various thicknesses to satisfy a multitude of uses.

The finished product may have corn, callous or bunion pads, insoles, bandage strips, and various other articles cut or stamped from it and when those articles are attached to the body of a user beneath an article of apparel, there is ample cushioning provided by the latex layer to transfer the pressure of an article of apparel away from an afflicted area of the body, ample cushioning to provide desirable pressure at any location on the body, and the external surface of the laminated article because of the plastic layer affords a smooth surface over which the apparel may easily be donned without any drag. The entire structure may be laundered when desired without injury. If so desired, cementitious material of the pressure sensitive or other type may be attached or provided upon the exposed face of the latex layer. In other instances, the entire structure may be utilized as a cover for certain types of furniture, for various implements requiring handling, and in many other locations and for other purposes as will be apparent to one skilled in the art.

The invention is economical to manufacture and highly efficient in use.

It will be understood that modifications and variations may be effected without departing from the scope of the novel concepts of the present invention.

I caim as my invention:

1. A laminated material including a relatively thick sheet of flexible, cellular foam latex one side of which has coarser pores than the other, and a relatively thin thermoplastic film adhered to said latex sheet over said one side to seal the coarser pores.

2. The method of making a laminated sheet, including the step of spraying a thermoplastic resinous film over the more porous side of a cellular latex layer having a relatively porous side and a relatively non-porous side.

3. The method of making a laminated material, including the steps of splitting a sheet of foam latex into separate layers, and adhering the side of a latex layer next the split to a vinyl plastic film.

WILLIAM M. SCHOLL.

REFERENCES CITED

The following references are of record in the file of this patent:

UNITED STATES PATENTS

| Number | Name | Date |
| --- | --- | --- |
| 1,519,009 | Reina | Dec. 9, 1924 |
| 1,587,486 | Marshall | June 1, 1926 |
| 2,158,033 | McKinney | May 9, 1939 |
| 2,180,304 | Minor | Nov. 14, 1939 |
| 2,263,285 | Bolog | Nov. 18, 1941 |
| 2,278,777 | Garvey et al. | Apr. 7, 1942 |
| 2,370,913 | Procter | Mar. 6, 1945 |
| 2,376,653 | Boyer | May 22, 1945 |